Patented Feb. 8, 1938

2,107,807

UNITED STATES PATENT OFFICE 2,107,807

PROCESS FOR SEPARATING MINERAL OIL PRODUCTS

Hermann Suida and Hans Pöll, Vienna, and Alfred Nowak, Mödling, Austria

No Drawing. Application April 24, 1935, Serial No. 18,074. In Austria May 5, 1934

10 Claims. (Cl. 196—13)

The present specification relates to a process for separating mineral oil products, distillates or concentrates into paraffinic, naphthenic and aromatic portions with simultaneous refining of the paraffinic and naphthenic portions.

In the solvent processes hitherto known for extracting and refining mineral oil products there occurs only a separation into a refined paraffinic portion which is more or less pure and into an extract which contains all the aromatic, resinous and asphaltic substances, as well as the whole or part of naphthenic substances. In these processes it is either necessary, if the yield of the refined paraffins is to be large, to dispense with particular purity of the paraffins since these are more or less contaminated by naphthenic substances; if however, it is desired to obtain the paraffins in a very pure state and free from naphthenes the yield will be a very limited one.

By previous investigations we have already discovered that it is possible to separate mineral oil products, distillates and concentrates into three portions:

A paraffinic portion of excellent quality,

A valuable cyclic (naphthenic) portion, and finally

A portion containing aromatic, resinous and asphaltic substances. This separation is carried out by using only one solvent, viz. crude cresol, on the one hand, in anhydrous state, on the other hand, in aqueous state.

We have now discovered, and this is the subject matter of the present invention, that it is possible to obtain much better results compared with those which are obtained by working with the above mentioned crude cresol, by using as a solvent a mixture of anhydrous crude cresol with a second liquid of water repellent nature, which has also a greater dissolving power for naphthenic oils and is capable of lowering the viscosity of the solvent as a whole.

According to the present invention this mixture is first used in the anhydrous state for separating the pure paraffinic portions, whereafter it is applied saturated with water for the separation of pure naphthenic portions of the mineral oil product treated. After separation of the latter product the aqueous solution contains only the aromatic, resinous and asphaltic substances.

The use of a second solvent having a great dissolving power for naphthenic oils together with crude cresol effects a decrease of the viscosity in the extraction process and lowers the total amount of solvent required, without reducing the water absorbent capacity of the crude cresol— the amount of the second solvent added to the crude cresol being only small—to an extent which would render impossible the complete separation of the useful naphthenic portions.

As a supplemental solvent added to crude cresol all liquid solvents for naphthenic substances are suitable which are of a highly water repellent nature and do not differ too far in their boiling point from the boiling range of crude cresol. Since the additional solvents, as already mentioned, should lower the viscosity of the cresol and the mixed solvent as a whole they must not tend themselves to associate as strongly as cresol. The before-mentioned features apply for instance to the following solvents:

Nitrobenzene, nitrotoluene, xylidines, ethylaniline, dichlorobenzenes, dichloro-diethyl-ether and others. The above mentioned examples of additional solvents are mentioned to illustrate the invention without restricting its scope.

According to the present invention these solvent mixtures are used for separating mineral oil products, distillates and concentrates into a refined paraffinic portion, a refined naphthenic portion and a portion containing aromatic, resinous and asphaltic substances.

In carrying out the process according to the invention we may proceed by allowing the anhydrous mixture of solvents to act on the mineral oil product at about 15° C. below the temperature of demulsification, the paraffinic portion thus remaining undissolved in a state of high purity. Thereafter the naphthenic portions are separated in a pure state by saturating the extract with water. The process may also be carried out in such a manner, that at an increased temperature the entire mineral oil products are dissolved in the anhydrous solvent into a clear solution, whereafter the solution is cooled down to about 15° C. below the temperature of demulsification in order to separate the paraffinic portion.

In some cases it has proved to be advantageous to carry out the above described method of separation only after having subjected the mineral oil product to a preliminary purification by extracting, with a certain quantity of the aqueous mixture of solvents, the main portion of the asphaltenes, resins and aromatic substances. After this preliminary extraction has been carried out the main treatment is performed in the manner as described before, that is to say the solvent is first applied in the anhydrous state so that the paraffinic portion remains undissolved in a pure state, whereafter by saturating with water the naphthenes are separated from the extract. If the process is carried out in this manner two aqueous extracts are obtained which are joined afterwards. Although in this way a larger quantity of solvent is consumed this modification in some cases enables the naphthenic portion to be obtained in a purer state than by the normal method, the yield being approximately equal.

The saturation with water of the extract containing the naphthenic and aromatic portions, which is a feature of the present process, is not similar to the addition of water according to the known methods which use the water for recovering the solvent from mixtures of oil and solvent. For in these latter processes the water does not bring about a separation between naphthenic and aromatic oils, that is a separation of two portions of the oil to be refined, but in the known processes the water only serves for separating and recovering the solvent from the hydrocarbon with which it is in a homogeneous liquid phase.

The process is very flexible as regards the quality of the material to be treated as well as the quantity and quality of the paraffinic and naphthenic portions. Contrary to the processes used up to the present the maximum quantity of solvent required is small. With very dark distillates the maximum quantity of solvent amounts to 150 per cent. of the distillate. When treating materials of higher purity the required quantity can sometimes be reduced to about 100 per cent. The extraction with an anhydrous mixture of solvents may be carried out periodically or continuously. In the periodical mode of execution the total amount of solvent is divided into three unequal portions, and the extraction is first carried out with the largest portion, then with the smaller portion and finally with the smallest portion. In all of these three cases the oil may be brought completely into solution by heating it and then the separation takes place by cooling.

The process may be performed in three centrifugal saparators arranged in series, each of which is connected to a mixing apparatus. In this case the work may be carried out continuously in counter-current. If extraction towers are used it is also possible to operate continuously in counter-current. The saturation of the extract with water and the precipitation of the naphthenic portion may preferably be carried out by a mixing pump, whereafter the separation takes place in a settling tank or in a centrifugal separator.

If smaller quantities of solvent are used the yield of paraffinic portions of highest purity is not increased but the yield of naphthenic substances becomes larger. It may be advantageous to use a smaller amount of solvent if the oil to be treated is sufficiently pure to give naphthenes of satisfactory purity though they are separated in a larger quantity in consequence of the small amount of solvent used.

An increase in the yield of the paraffinic portions—though of a somewhat inferior quality—is brought about by working at a lower temperature when separating the anhydrous extract from the paraffinic portions. By this mode of operation purely naphthenic bodies will be separated together with the paraffinic ones and increase the yield of the latter.

In some cases it may be desirable to choose this working method particularly if the naphthenic portions have a very low specific gravity and a high viscosity index.

By the described variations of the amount of solvent mixture and the temperature of separation the process may be adapted to any requirements.

The separated paraffinic and naphthenic raffinates contain a few percent of solvent which are recovered by distilling off in vacuum until there remains only a small amount which is removed by blowing with some superheated steam. If necessary, the raffinates free from solvent are mixed with 1 per cent. of bleaching earth, filtered and are then ready for use without further treatment.

If a further improvement of the naphthenic portion is desired the latter may be treated again with a certain quantity of anhydrous solvent at low temperature; by this means it is possible to obtain, even in the most unfavourable cases, naphthenic raffinates with light colour and good resistance against oxidation. In most cases such after-treatment is, however, not necessary.

The paraffinic and naphthenic raffinates obtained according to the present process all show, apart from their excellent viscosity properties (highest possible viscosity index) and from the low specific gravity, exceedingly good resistance against oxidation.

The process is illustrated by the following examples:

*Example 1.*—100 parts of a crude distillate of a mixed base European oil ($V_{50}=9.9°$ Engler, viscosity index (according to Walther) $mVk=4.21$) are agitated with 150 parts of a mixture of 85 parts of crude cresol and 15 parts of nitrobenzene. The separated paraffinic portion is completely refined, light yellow and has a viscosity index (Walther) of $mVk=3.78$. 27 parts of this raffinate are obtained.

The extract is saturated with water, allowed to settle, whereafter the top layer which has a bright blue fluorescence is removed. It consists of pure naphthenic components, is completely free from resins and thus refined and has a viscosity index (Walther) of 4.02. The yield is 41 parts. The remaining extract containing the mixture of solvents is completely separated by distillation, if desired with steam, from the solvent mixture and consists of a dark oil which contains the aromatic, resinous and asphaltic substances.

If nitrobenzene alone is used for separating the paraffinic portions, only 23 parts of paraffinic components having the same viscosity index are obtained. If crude cresol is alone used 31 parts of a paraffinic oil having a somewhat inferior viscosity index are obtained but only 38 parts of naphthenic oils. For this separation 150 parts of solvent are not sufficient, but it is necessary to use 200–250 parts of crude cresol.

*Example 2.*—100 parts of a Russian engine oil distillate, specific gravity 0.922 at 20° C., viscosity 8.3° Engler at 50° C., viscosity index (A. S. T. M.) 50 is treated at a temperature of 10° C., with 140 parts of a mixture of 85 per cent. by volume of crude cresol and 15 parts by volume of nitrotoluene in a unit consisting of three mixing pumps and three centrifugal separators arranged in series. In the first mixing pump the oil is intimately mixed with 80 parts of solvent and in the first separator the extract is separated from the undissolved oil; thereupon the undissolved oil is mixed in the second mixing pump with 40 parts of fresh solvent and the undissolved oil separated in the second separator. The process is repeated in the third mixing pump and in the third separator with 20 parts of fresh solvent. The extracts from the three separators are joined. The oil which has remained undissolved is freed as in Example 1 from remainders of solvent and consists of a very light paraffinic raffinate having a specific gravity of 0.885 at 20° C., a viscosity of 5.5° Engler at 50° C. and a viscosity index of 90. The yield is 52 per cent. by volume of the distillate. The joined extracts are intimately mixed in a fourth mixing pump with 10 parts of water and from a fourth separator the naphthenic oil is discharged in a clear state. It is then freed from solvent remainders as described in Example 1, mixed while warm with 1 per cent. of bleaching earth, filtered and consists then of a raffinate having a good colour, a specific gravity of 0.910 at 20° C., a viscosity of 7.8° Engler at 50° C. and a viscosity index of 72. The yield amounts to 28 per cent. by volume of the distillate. The extract saturated with water is mixed with 40 per cent. of a medium gasoline and the water is completely removed by distilling off the gasoline. The anhydrous extract is now freed from solvent by distillation in vacuum, the solvent being obtained in an anhydrous state.

Example 3.—100 parts of a Russian Brightstock, specific gravity 0.905 at 20° C., viscosity 31° Engler at 50° C., viscosity index 84, are extracted with 120 parts of a mixture of 80 per cent. by volume of crude cresol and 20 per cent. by volume of dichloro-diethyl-ether. The mode of operation is as in Example 2, that is to say the solvent is divided into three portions and the extraction is performed at 35 to 40° C. The paraffinic raffinate freed from remainders of solvent has a specific gravity of 0.896 at 20° C., a viscosity of 25.6° Engler at 50° C. and a viscosity index of 93, it is of a light green-yellow colour, completely transparent and obtained in a yield of 74 per cent. by volume of the oil treated. The naphthenic raffinate is obtained by separating with water, distilling off and filtering with 1 per cent. of bleaching earth to a bright colour and a yield of 18.5 per cent. The specific gravity is 0.914 at 20° C., the viscosity 34.5° Engler at 50° C., the viscosity index 72.

Example 4.—100 parts of a heavy Persian distillate having a sulphur content of 4.1 per cent., a specific gravity of 0.953 at 20° C., a viscosity of 16° Engler at 50° C., a viscosity index (A. S. T. M.) of 43, are extracted at 15° C. with 150 parts of a mixture of 82 per cent. by volume of crude cresol and 18 per cent. by volume of dichloro-benzene (liquid), the solvent being divided into several portions. The paraffinic distillate thus obtained shows a light colour, the yield being 30 per cent. by volume, specific gravity 0.880 at 20° C., viscosity 7.5° Engler at 50° C., viscosity index 92, sulphur content 0.5 per cent. The naphthenic portion obtained, the yield of which is 35 per cent. by volume, shows satisfactory characteristics (specific gravity 0.920 at 20° C., viscosity 10.8° Engler at 50° C., viscosity index of 76) but its colour is not yet satisfactory. This portion is, therefore, after-treated with 50 parts of the anhydrous mixture of solvents at 0° C., 30 per cent. of the naphthenes being dissolved and 70 per cent. remaining undissolved. After separating the remainders of solvent by distilling in vacuum and blowing with superheated steam, the naphthenic raffinate twice refined shows a very light colour, a specific gravity of 0.900 at 20° C., a viscosity of 8.5° Engler at 50° C. and a viscosity index of 90.

Example 5.—100 parts of a spindle oil distillate of Asiatic origin, having a specific gravity of 0.895 at 20° C., a viscosity of 1.95° Engler at 50° C., a viscosity index of 32 are extracted in three portions with 100 parts of a mixture of 80 per cent. by volume of crude cresol and 20 per cent. by volume of ortho-toluidene at 10° C. The paraffinic raffinate is obtained very light in colour and with a yield of 40 per cent. by volume, the specific gravity being 0.850 at 20° C., the viscosity 1.90° Engler at 50° C. and the viscosity index 92. The naphthenic portions separated with water amount to 35 per cent. by volume of the oil treated, have light colour and show a specific gravity of 0.875 at 20° C., a viscosity of 2° Engler at 50° C. and a viscosity index of 60. The oil contained in the extract in a quantity of 25 per cent. by volume of the oil treated consists of a dark oil, having a specific gravity of 0.975 at 20° C. a viscosity of 3.8° Engler at 50° C. and a viscosity index of 38.

Naphthenic acids which in some oils are present in larger quantities, particularly in Roumanian oils, but also in several other distillates, pass over into the extract when the oils are treated according to the above described methods; thus by the extraction also a complete deacidification of the distillates in question is effected.

What we claim is:—

1. In a process for separating and refining mineral oils containing paraffinic, naphthenic and aromatic portions by the alternate use of a selective solvent in anhydrous and water saturated stages; the improvement which comprises employing as the solvent a mixture consisting solely of crude cresol and a water repellent selective solvent which has a high dissolving power for naphthenic oils and is capable of lowering the viscosity of the solvent as a whole.

2. A process for separating mineral oil products into paraffinic, naphthenic and aromatic portions with simultaneous refining of the paraffinic and naphthenic portions, which comprises treating the mineral oil product with an anhydrous mixture consisting of crude cresol and a water repellent solvent which has a high dissolving power for naphthenic oils, the paraffinic portion being separated thereby in a refined state, thereafter saturating the extract with water, the naphthenic portion being thereby separated in a refined state, the aromatic, resinous and asphalt compounds remaining in the mixture of solvent and water being finally recovered therefrom.

3. A process for separating mineral oil products into paraffinic, naphthenic and aromatic portions with simultaneous refining of the paraffinic and naphthenic portions, which comprises first extracting the oil products with a water saturated mixture consisting of crude cresol and a water repellent solvent, thus dissolving the main quantity of aromatic resinous and asphaltic compounds, thereafter extracting the undissolved portion of the oil with an anhydrous mixture of said solvents, separating the paraffinic portions in a pure state, saturating the extract with water, thereby separating the naphthenic substances in a pure state and finally joining the solution of aromatic, resinous and asphaltic compounds in the aqueous mixture of solvents with the aqueous extract first obtained.

4. A process as set forth in claim 1 wherein the solvent consists of a mixture of 70–90 parts of crude cresol and 30–10 parts of nitrobenzene.

5. A process as set forth in claim 1, wherein the solvent consists of a mixture of crude cresol and nitrobenzene.

6. A process as set forth in claim 1, wherein the solvent consists of a mixture of crude cresol and xylidine.

7. A process as set forth in claim 1, wherein the solvent consists of a mixture of crude cresol and dichlorbenzene.

8. A process as set forth in claim 1, wherein the water repellent solvent is a nitro-aromatic compound.

9. A process as set forth in claim 1, wherein the water repellent solvent is an arylamine.

10. A process as set forth in claim 1, wherein the water repellent solvent is an organic halogen derivative.

HERMANN SUIDA.
HANS PÖLL.
ALFRED NOWAK.